UNITED STATES PATENT OFFICE.

DOMENICO LO MONACO, OF ROME, ITALY.

PROCESS FOR THE TREATMENT OF UNDECOMPOSED FERTILIZING SUBSTANCES.

1,402,638. Specification of Letters Patent. Patented Jan. 3, 1922.

No Drawing. Application filed March 1, 1921. Serial No. 448,872.

*To all whom it may concern:*

Be it known that I, DOMENICO LO MONACO, a subject of the King of Italy, and resident of Rome, Italy, (whose post-office address is Via Depretis No. 92, Rome, Italy,) have invented certain new and useful Improvements in Processes for the Treatment of Undecomposed Fertilizing Substances, (for which I have filed an application in Italy Feb. 26, 1920), of which the following is a specification.

The object of the present invention refers to a process for the improvement of undecomposed fertilizing substances.

It is known that undecomposed or partially decomposed fertilizing substances such as for instance humus contain organic and inorganic substances. The former may contain nitrogen or not (hydrocarbides and fats). Due to their reluctancy to decompose they remain nearly all in an insoluble status and are thus utilized by the plants only in a very slight quantity.

The object of the invention is to submit such fertilizing substances (i. e., humus) to a chemical treatment which will allow the hydrolyzation of the organic substances. This treatment excites in an extraordinary way the germination, and forwards thus the formation of numerous roots, which will facilitate the absorption of the fertilizing substances and make the plants more luxuriant. The same applies to the inorganic substances which, as a consequence of the treatment, pass from the insoluble and non-absorbable state to the soluble and absorbable state.

The process consists in exposing the undecomposed or partially decomposed fertilizing substances to the action of the halogen gases (Cl. Br. I. and Fl).

The process is carried out by means of a special apparatus, consisting of a cylindrical casing of suitable dimensions in which an agitating device works, said device having two series of arms and being adapted to be lifted. The case is closed, and the lid has an opening to allow the material to be placed in the case and similarly the bottom has an appropriate opening to allow the refined fertilizer to pass in the discharge pipe and to the lower floor. The gases are brought to the case by means of convenient pipes.

Motive power for the agitator is supplied by a suitable motor.

Batteries of cases may be disposed one after the other at suitable distance. Other substances besides humus may undergo the treatment set forth, namely all such fertilizers used as nitrogen fertilizers; for example manures, rubbish, refuse of vegetables, ricinus, colza, lemons, etc., ground horns and nails, dried blood, chrysalids, bones, leather refuse, cloth refuse, etc., and organic refuse of all kinds.

The same treatment may also be applied to the inorganic fertilizers, such as superphosphates, potassium bearing substances, etc., augmenting thus the degree of solubility.

Having now particularly described and ascertained the nature of the said invention and in what manner the same is to be performed I declare that what I claim is:

The herein described process for treating incompletely decomposed fertilizing substances, consisting in agitating the substances and subjecting them while being agitated to the action of halogen gases, whereby the substances are wholly decomposed and converted into a fertilizer ready for immediate use.

In testimony whereof I have hereunto signed my name in the presence of two witnesses.

PROF. DOMENICO LO MONACO.

Witnesses:
A. BOJEBE SENTER,
G. B. ZANARDO.